United States Patent [19]

Hirano

[11] Patent Number: 5,333,813
[45] Date of Patent: Aug. 2, 1994

[54] FISHING LINE RETAINING DEVICE IN REEL FOR FISHING

[75] Inventor: Kazuo Hirano, Tokyo, Japan

[73] Assignee: Daiwa Seiko, Inc., Tokyo, Japan

[21] Appl. No.: 917,192

[22] Filed: Jul. 22, 1992

[30] Foreign Application Priority Data

Aug. 6, 1991 [JP] Japan .................................. 3-69726

[51] Int. Cl.$^5$ ............................................. A01K 89/01
[52] U.S. Cl. ...................................... 242/322; 24/458
[58] Field of Search ....................... 242/224, 322, 323; 24/458

[56] References Cited

U.S. PATENT DOCUMENTS 3,483,698  4/1947  Giera ................................. 242/224
4,883,238  11/1989  Harder ........................... 242/323 X

FOREIGN PATENT DOCUMENTS

57-14048  3/1982  Japan .
61-6760   2/1986  Japan .
63-86762  6/1988  Japan .

Primary Examiner—Daniel P. Stodola
Assistant Examiner—Eileen A. Dunn
Attorney, Agent, or Firm—Longacre & White

[57] ABSTRACT

A square hole (1b) and a recessed part (1c) are formed on the outer periphery of a cylinder part (1a) of a spool (1). A fishing line retaining inner member (2) is fitted into and secured to the square hole (1b) and the recessed part (1c). A square hole (2a) is formed in the inner member (2). A leg part (3a) of a fishing line retaining outer member (3) is passed through the squre hole (2a). A pin (1d) is fitted into a through hole (3b) of the leg part (3a) and so that the outer member (3) is secured to the spool (1) by a spring washer (10). The inner retaining member (2) and the outer retaining member (3) are made of metal or synthetic resin. A lower retaining face (3d) of a retaining part (3c) of the outer retaining member (3) and an upper retaining face (2b) of the inner retaining member (2) are substantially planar and in contact with each other so that the fishing line can be clamped and retained therebetween.

8 Claims, 8 Drawing Sheets

FISHING LINE RETAINING DEVICE IN REEL FOR FISHING

BACKGROUND OF THE INVENTION

The present invention relates to a fishing line retaining device in a reel adapted to retain in place a fishing line wound on a spool in place.

Devices for retaining a fishing line wound on a spool of a spinning reel for fishing have been disclosed in (1) Japanese Examined Utility Model Publication No. 57-14048, (2) Japanese Examined Utility Model Publication No. 61-6760 and (3) Japanese Unexamined Utility Model Publication No. 63-86762.

The fishing line retaining device disclosed in the above described Publication (1) is formed with such a structure that a fishing line is retained in a cut-out annular part provided on the outer periphery of a cylinder part at a rear part of a spool. The fishing line retaining device disclosed in the Publications (2) and (3) is constructed in such a manner that a retaining member is fitted radially inward of to a square hole opened in a cylinder part so as to project out of the outer periphery of the cylinder part at the rear part of a spool and that a fishing line is retained by holding it between the retaining member and the outer periphery of the cylinder part.

Figure 17:
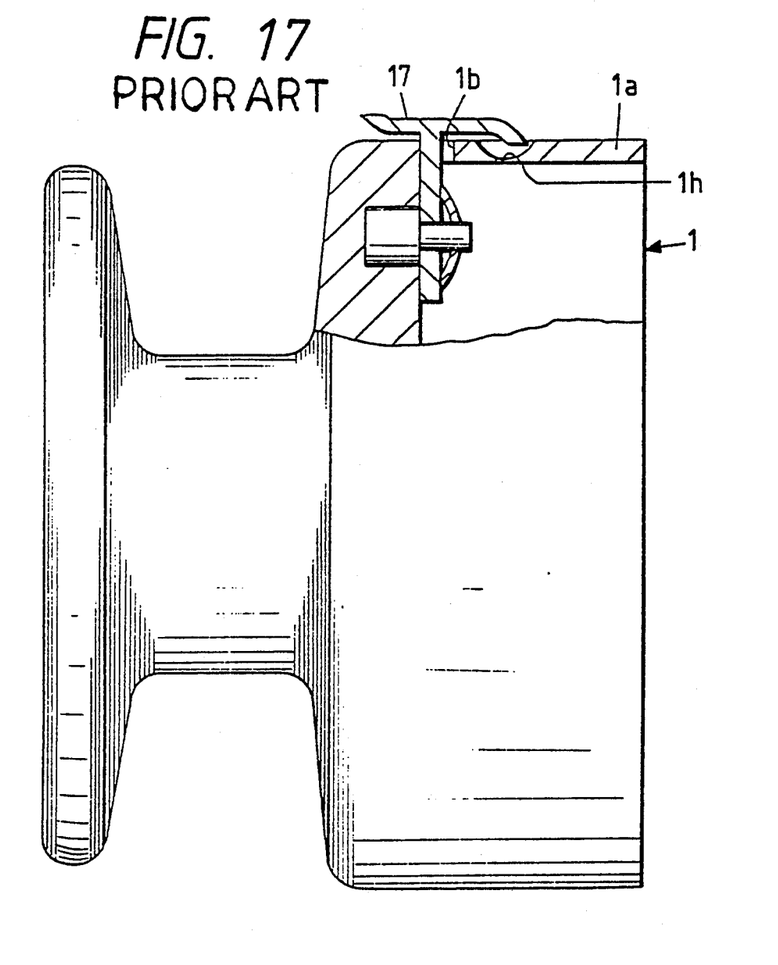
FIG. 17 is a longitudinally sectional view of a main part of a spool of a conventional fishing line retaining device applied to a spinning reel for fishing.
Figure 18:
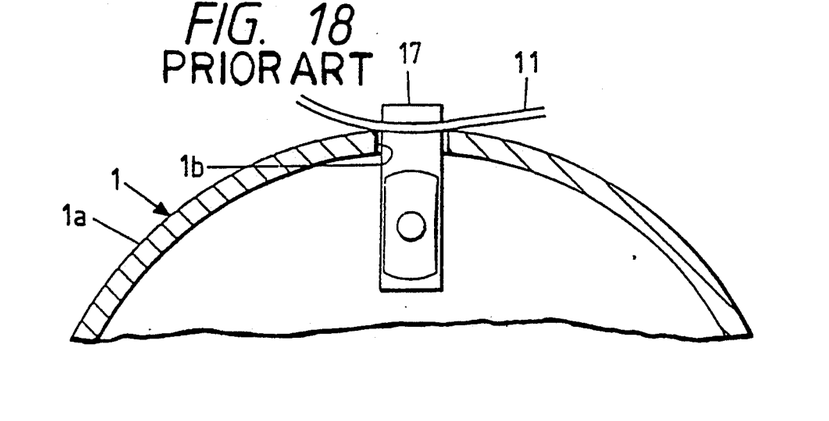
FIG. 18 is a sectional rear view of a main part of the above described spool.

FIGS. 17 and 18 are enlarged views of the structure of the fishing line retaining device disclosed in the above described Publication (3).

In the fishing line retaining device disclosed in the Publication (1), it has been troublesome to form apertures from a cut-out in the annular part. Edges of the aperture must be separately chamfered so as not to break a fishing line because of burrs and sharp edges. Therefore, cost has been increased. In the fishing line retaining device disclosed in the above described Publications (2) and (3), the square holes opened in the cylinder part have openings which are too wide when they are fabricated by a method other than cutting each opening one by one, so that a fishing line has been apt to fall into the hole as shown in FIG. 18. In the case where the square holes 1b are subjected to cutting one by one, cost becomes high. The aperture edge of the square hole 1b or the outline edge of the retaining member 17, after subjected to molding or working, must be chamfered so that the fishing line 11 is prevented from being damaged due to burrs and sharp edges. However, since, as shown in FIGS. 17 and 18, the square hole 1b and a recessed part 1h formed on a cylinder part 1a have a modified form, it is difficult to chamfer them. Since chamfering the square hole and retaining member a larger amount makes it impossible to retain the fishing line thereto, burrs or sharp edges are likely to retained. Flaws are thus formed on the fishing line due to the burrs or sharp edges which result in a drawback that the fishing line is cut when it is rubbed.

Particularly, the burrs on the aperture edge of the square hole cannot be properly removed by barrel finishing and so on, so that the burrs are inevitably left, and thus flaws are likely to be applied to the fishing line. Therefore, the above described conventional fishing line retaining device has a defect in that when the fishing line is rubbed on the retaining portion, it is cut off.

SUMMARY OF THE INVENTION

The present invention was made in order to overcome the problems mentioned above.

Accordingly, it is an object of the present invention to provide a fishing line retaining device on a reel for fishing comprising retaining means for retaining a fishing line thereon, which includes an outer member and an inner member, which members can be properly and easily subjected to removal treatment of burrs and sharp edges, whereby a fishing line cannot be cut off even when it is rubbed therein.

With this arrangement, when a fishing line wound on the body of a spool is retained in a fishing line retaining device, the fishing line is held and retained between the lower retaining face of the retaining part of an outer member and the retaining face of an inner member.

BRIEF DESCRIPTION OF THE DRAWINGS

The present invention will become more apparent from the following description of the preferred embodiments, with reference to the accompanying drawings, in which.

DETAILED DESCRIPTION OF THE PREFERRED EMBODIMENTS

Figure 1:
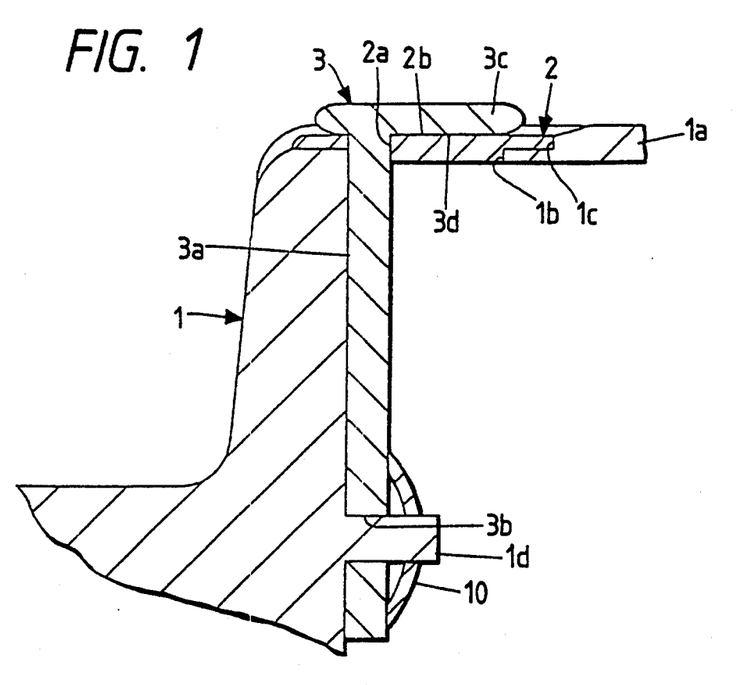
FIG. 1 is an enlarged, longitudinally sectional view of a fishing line retaining device showing a first embodiment for a spinning reel for fishing.
Figure 2:
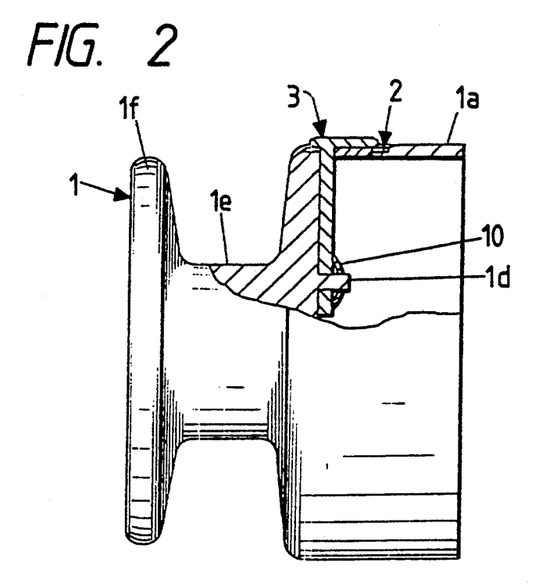
FIG. 2 is a longitudinally sectional view of a main part of a spool of the above described fishing line retaining device.
Figure 3:
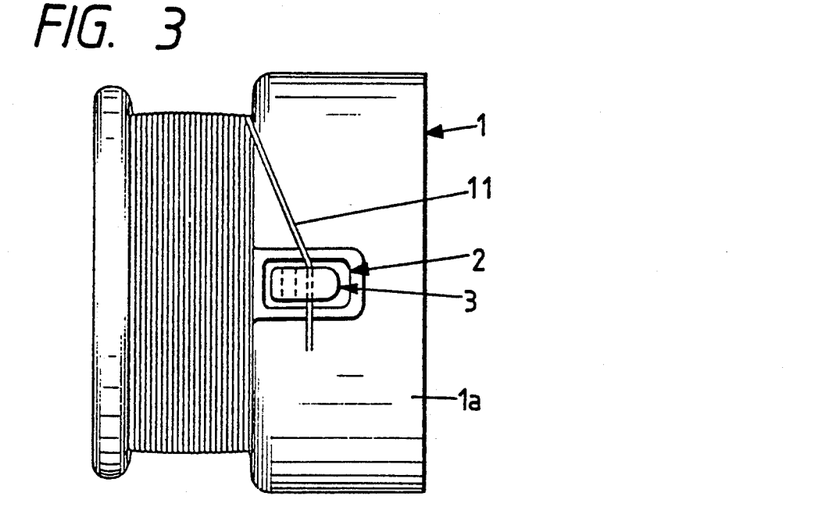
FIG. 3 is a plan view of a fishing line wound on the spool.
Figure 4:
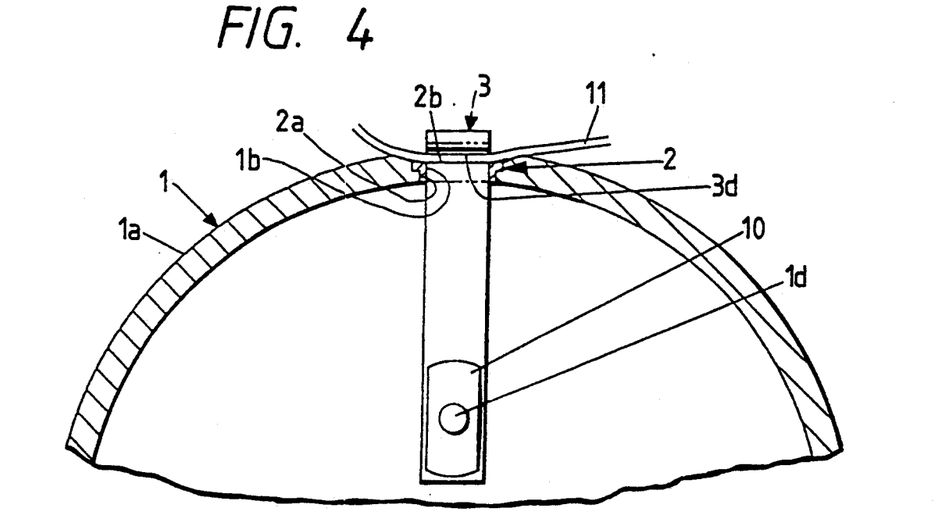
FIG. 4 is a sectional rear view of a main part of the spool.
Figure 5:
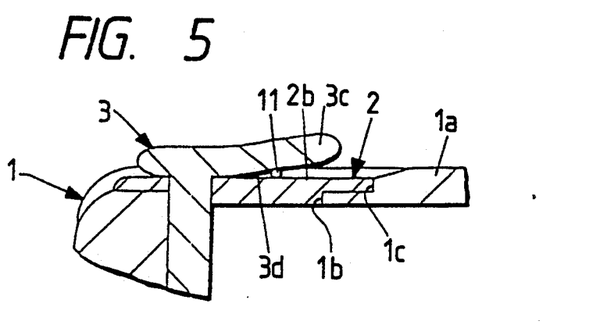
FIG. 5 is an enlarged, longitudinally sectional view of a main part of the fishing line retaining device in which the fishing line is retained.

FIGS. 1 to 5 show a first embodiment of a fishing line retaining device applied to a spinning reel for fishing. FIG. 1 is an enlarged, longitudinally sectional view of a fishing line retaining device; FIG. 2 is a longitudinally sectional view of a spool; FIG. 3 is a plan view of the spool on which a fishing line is wound; FIG. 4 is a sectional rear view of a main part of the spool; and FIG. 5 is an enlarged, longitudinally sectional view of a main part of the fishing line retaining device in which the fishing line is retained.

A spool 1 hereinafter used for explanation of the invention is intended to mean a spool and also a main body of a reel.

In FIGS. 1 to 4, a square hole 1b and a recessed part 1c are formed on the outer periphery of the cylinder part 1a of a spool 1. A pin 1d is integrally formed in a rear wall of the cylinder part 1a as one-piece structure. The pin 1d may be separately formed and subsequently fixed in place.

An inner member 2 which is one of a fishing line retaining means is fitted into and secured to the square hole 1b and the recessed part 1c. A square hole 2a is formed in the inner member 2.

An outer member 3 which is another of the fishing line retaining means has a leg part 3a passing through the square hole 2a. The pin 1d is fitted into a through hole 3b of the leg part 3a and then a spring washer 10 is fitted onto the pin 1d so that the leg part 3a is prevented from falling off therefrom.

The cylinder part 1a of the spool 1 surrounding the inner member 2 is provided with a recessed part 1c whose bottom face is flush with the upper face ensures the cylinder part 1a of the inner member 2 without difference in level.

A body 1e of the spool is formed at a front part of the cylinder part 1a of the spool 1. A collar part 1f is formed at a front part of the body of the spool.

The inner member 2 and the outer member 3 are made of metal or synthetic resin.

The outer member 3 is formed in a vertically inverted L-shape in section. An retaining part 3c is formed axially rearward of the outer member 3.

A lower retaining face 3d of the retaining part 3c of the outer member 3 and an upper retaining face 2b of the inner member 2 are formed to be substantially planar and in contact with each other.

The fishline retaining inner member 2 and the fishline retaining outer member 3 are subjected to molding and then to a removal of burrs and sharp edges by barrel finishing and so on.

When a fishing line 11 wound on the body part 1e of the spool 1 is retained in a fishing line retaining device, the fishing line is clamped and held between the lower retaining face 3d of the retaining part 3c of the outer member 3 and the retaining face 2b of the inner member 2, as shown in FIGS. 3 to 5.

With the fishing line retaining device constructed as mentioned above, since the retaining face 2b of the inner member 2 and the retaining face 3d of the outer member 3 are substantially planar and are simple in configuration, the removal of burrs is easily performed. Further, since it is easily possible to from the square hole 2a of the inner member 2 as a hole into which the leg part 3a of the outer can be tightly fitted without play or clattering, the fishing line cannot become engaged in the square hole 2a. Thus, no flaws are applied to the fishing line and the fishing line is not cut off even when the fishing line is rubbed.

Moreover, since the fishing line is prevented from being brought into contact with the square hole 1b of the cylinder part 1a, the removal of burrs of the spool 1 can be dispensed with.

In addition, since the retaining face 2b of the inner member 2 and the retaining face 3d of the outer member 3 are not complicated in configuration, the burrs can be readily removed at low cost.

Figure 6:
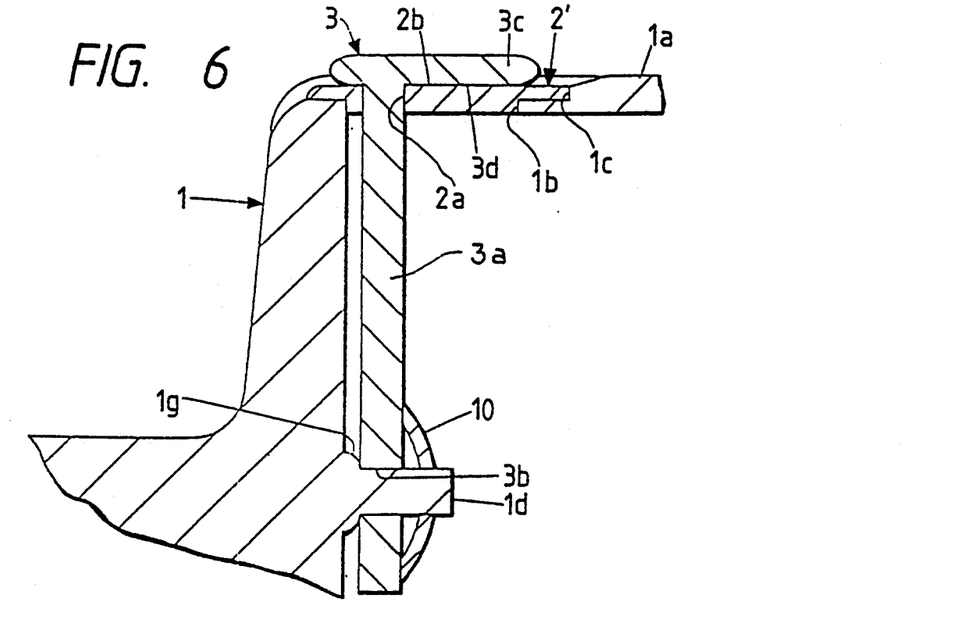
FIG. 6 is an enlarged, longitudinally sectional view of a fishing line retaining device showing a second embodiment for a spinning reel for fishing.

FIG. 6 shows a second embodiment of a fishing line retaining device adapted to a spinning reel for fishing. FIG. 6 is an enlarged, longitudinally sectional view of the fishing line retaining device.

In FIG. 6, a fishline retaining inner member 2' is formed of elastic material such as rubber. The inner member 2' is fitted into and secured to a square hole 1b and a recessed part 1c provided in the outer periphery of the cylinder part 1a of the spool 1. A pin 1d and a spherical face 1g are integrally formed on a rear wall of the cylinder part 1a as a one-piece structure. The pin 1d and spherical face 1g may be separately formed to be fixed there.

The inner member 2' has a square hole 2a and an upper retaining face 2b.

A leg part 3a of a fishline retaining outer member 3 is passed through this square hole 2a. The pin 1d is fitted into a through hole 3b of the leg part 3a so that the leg part 3a is secured to the pin 1d by means of a spring washer 10 fitted to the pin 1d.

A retaining face 3d is formed on a lower face of the retaining part 3c of the outer member 3.

Figure 7:
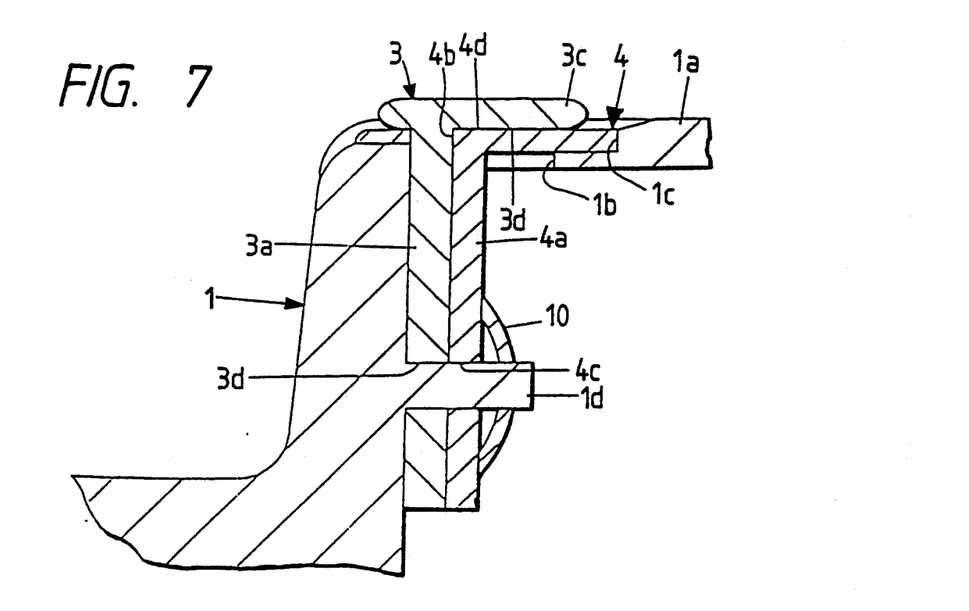
FIG. 7 is an enlarged, longitudinally sectional view of a fishing line retaining device showing a third embodiment for a spinning reel for fishing.

FIG. 7 shows a third embodiment of a fishing line retaining device adapted to a spinning reel for fishing. FIG. 7 is an enlarged, longitudinally sectional view of a fishing line retaining device.

In this embodiment, a fishline retaining inner member 4 is formed in a vertically inverted L-shape in section similarly to the outer member 3.

A leg part 4a and a square hole 4b are formed in the inner member 4. Through the square hole 4b is passed the leg part 3a of the outer member 3. The leg part 4a is passed through a square hole 1b of a spool 1 together with the leg part 3a. Into a through hole 3b of the leg part 3a and a through hole 4c of the leg part 4a is fitted a pin 1d, so that the outer and inner members 3 and 4 are secured to the pin 1d by means of a spring washer 10.

An upper side of the inner member 4 is fitted into and secured to a recessed part 1c formed in a cylinder part 1a of a spool 1. A retaining face 4d is formed on an upper face of the inner member.

A retaining face 3d is formed on a lower face of an retaining part 3c of the outer member 3.

Figure 8:
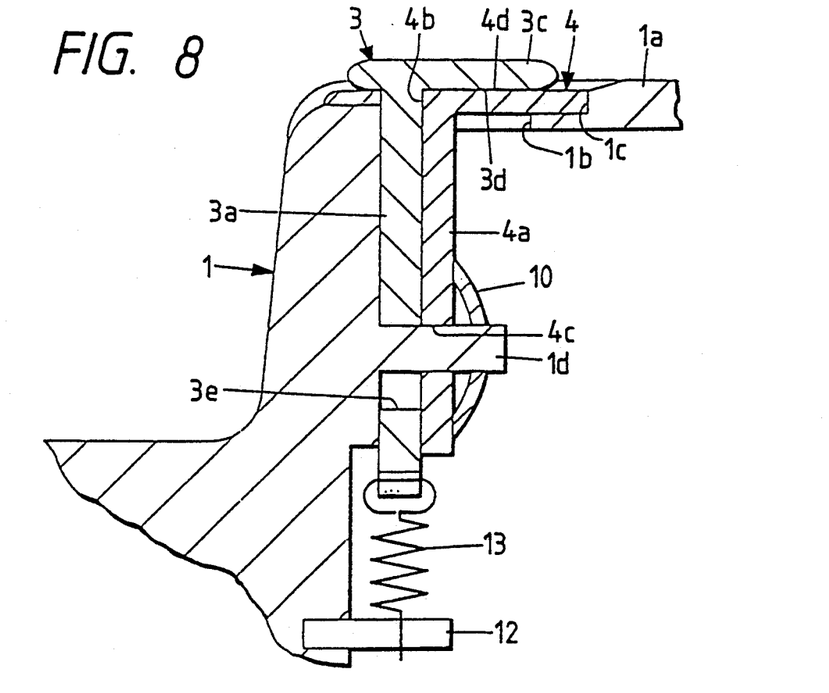
FIG. 8 is an enlarged, longitudinally sectional view of a fishing line retaining device showing a fourth embodiment for a spinning reel for fishing.

FIG. 8 shows a fourth embodiment of a fishing line retaining device adapted to a spinning reel for fishing. FIG. 8 is an enlarged, longitudinally sectional view of the fishing line retaining device.

A slotted hole 3e is formed in a leg part 3a of an outer member 3. A leg part 4a and a square hole 4b are formed in an inner member 4. Through the square hole 4b is passed the leg part 3a of the outer member 3. The leg part 4a is passed through a square hole 1b of a spool 1 together with the leg part 3a . Into the slotted hole 3e of the leg part 3a and a through hole 4c of the leg part 4a is fitted a pin 1d to which a spring washer 10 is fitted so that the outer and inner members 3 and 4 are prevented from falling off from the pin 1d.

A spring 13 is urgingly provided between the leg part 3a and a pin 12 provided on a rear wall in a cylinder part 1a.

An upper side of the inner member 4 is fitted into and secured to a recessed part 1c formed in the cylinder part 1a of the spool 1, and a retaining face 4d is formed on an upper face of the inner member 4.

A retaining face 3d is formed on a lower face of an retaining part 3c of the outer member 3.

Figure 9:
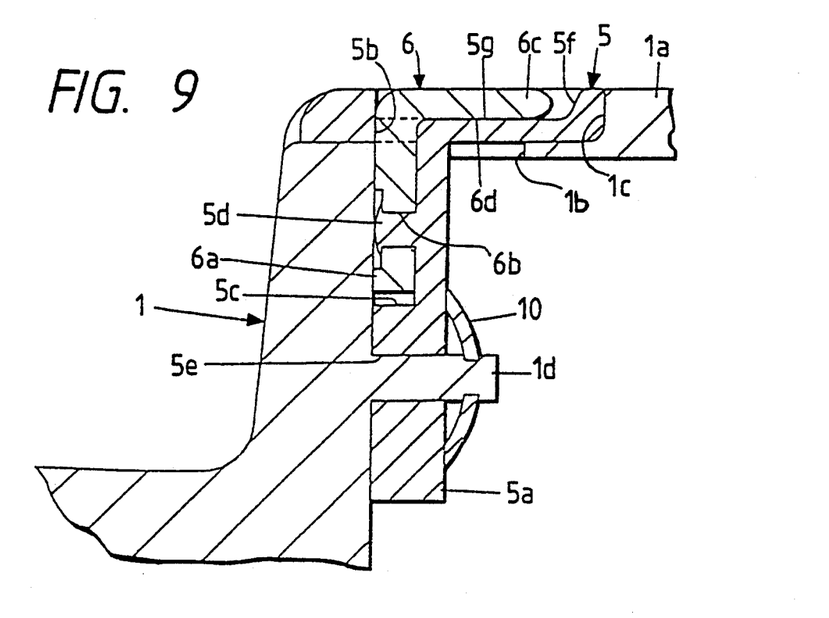
FIG. 9 is an enlarged, longitudinally sectional view of a fishing line retaining device showing a fifth embodiment for a spinning reel for fishing.

FIG. 9 shows a fifth embodiment of a fishing line retaining device adapted to a spinning reel for fishing. FIG. 9 is an enlarged, longitudinally sectional view of a fishing line retaining device.

A fishline retaining outer member 6 and a fishline retaining inner member 5 are united with each other.

A leg part 5a and a square hole 5b are formed in the inner member 5. A cut-out part 5c and a pin 5d are formed in the leg part 5a below the square hole 5b.

A through hole 5e is formed in the leg part 5a. A pin 1d is fitted into the through hole 5e and secured thereto by a spring washer 10 so that the inner member 5 is prevented from falling off therefrom.

An upper side of the inner member 5 is fitted into and secured to a recessed part 1c formed in a cylinder part 1a of a spool 1.

On the upper side of the inner member 5 is formed a recessed part 5f. On a top face of the recessed part 5f is formed an retaining face 5g.

Into the cut-out part 5c formed in the leg part 5a of the inner member 5 is fitted a leg part 6a of the hook shaped outer member 6. Into a through-hole 6b of the leg part 6a is fitted the pin 5d . The outer member 6 is prevented from falling off from the inner member 5 by caulking a head part of the pin 5d.

An retaining face 6d is formed on a lower face of an upper retaining part 6c of the outer member 6.

Figure 10:
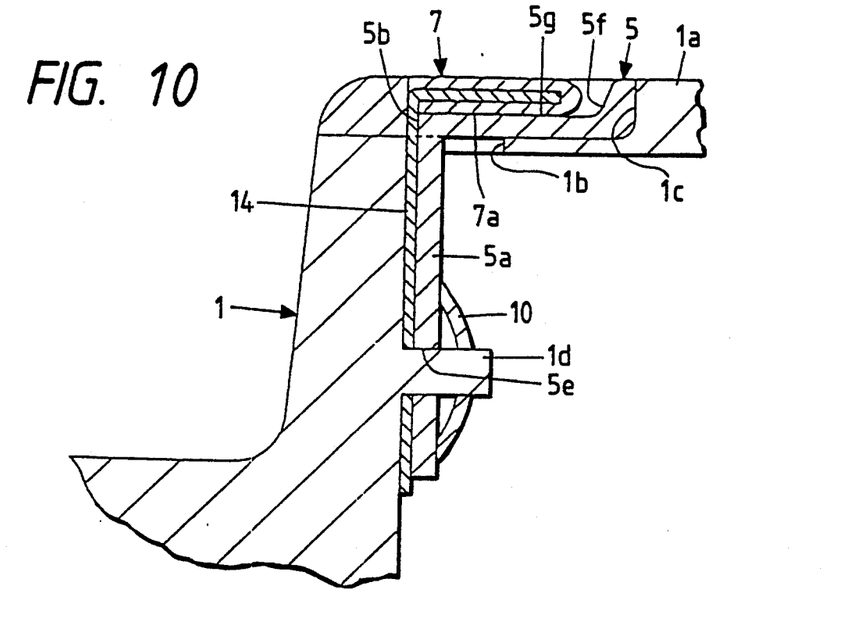
FIG. 10 is an enlarged, longitudinally sectional view of a fishing line retaining device showing a sixth embodiment for a spinning reel for fishing.

FIG. 10 shows a sixth embodiment of a fishing line retaining device adapted to a spinning reel for fishing. FIG. 10 is an enlarged, longitudinally sectional view of the fishing line retaining device.

A leg part 5a and a square hole 5b are formed in an fishline retaining inner member 5.

On an upper side of the inner member 5 is formed a recessed part 5f.

The upper side of the inner member 5 is fitted into and secured to a recessed part 1c formed in a cylinder part 1a of a spool 1.

A recessed part 5f is formed on the upper side of the inner member 5. On a bottom face of the recessed part 5f is formed an retaining face 5g .

A fishline retaining outer member 7 is fixed to an upper side of a leaf spring 14 formed in a substantially vertically inverted L-shape in section.

The leaf spring 14 is overlaid on the leg part 5a of the inner member 5. The leaf spring 14 and the leg part 5a are secured in place by a pin 1d passing through the spring 14 and the leg part 5a and by a spring washer 10 fixed to be pin 1d.

An retaining face 7a is formed on a lower face of the outer member 7.

Figure 11:
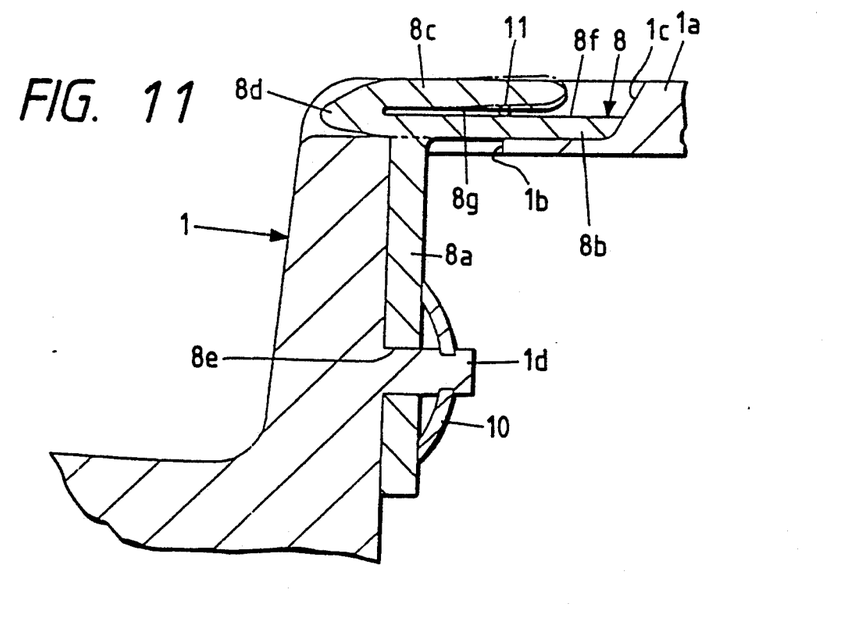
FIG. 11 is an enlarged, longitudinally sectional view of a fishing line retaining device showing a seventh embodiment for a spinning reel for fishing.

FIG. 11 shows a seventh embodiment of a fishing line retaining device adapted to a spinning reel. FIG. 11 is an enlarged, longitudinally sectional view of the fishing line retaining device.

An inner member and an outer member for retaining a fishing line are integrally formed as a one-piece fishline retaining member 8.

The member 8 includes a leg part 8a , an inner retaining member 8b , an outer retaining member 8c and a protruding part 8d which are formed as a one-piece structure. On the leg part 8a is formed a through hole 8e into which a pin 1d is fitted. The leg part 8a is secured to the pin 1d to be prevented from falling off therefrom by means of a spring washer 10.

The inner retaining member 8b is fitted into and secured to a recessed part 1c formed in a cylinder part 1a of a spool 1. On an upper face 8f of the inner retaining member 8b is formed an retaining face 8f.

An retaining face 8g is formed on a lower face of the outer retaining member 8c.

When the fishing line 11 is clamped and held retained between the retaining face 8f of the inner retaining member 8b and the retaining face 8g of the outer retaining member 8c , the outer retaining member 8c is brought into a position as shown by two-dot chain lines in FIG. 11.

Figure 12:
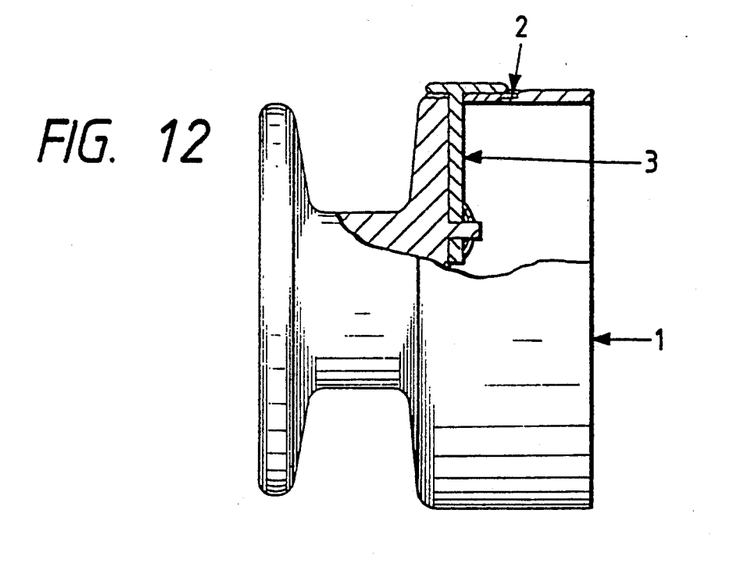
FIG. 12 is a longitudinally sectional view of a main part of a spool showing an eighth embodiment of a fishing line retaining device for a spinning reel for fishing.
Figure 13:
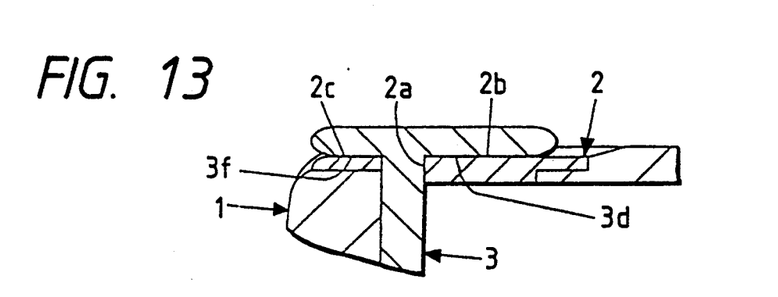
FIG. 13 is an enlarged, longitudinally sectional view of a main part of the above described fishing line retaining device.
Figure 14:
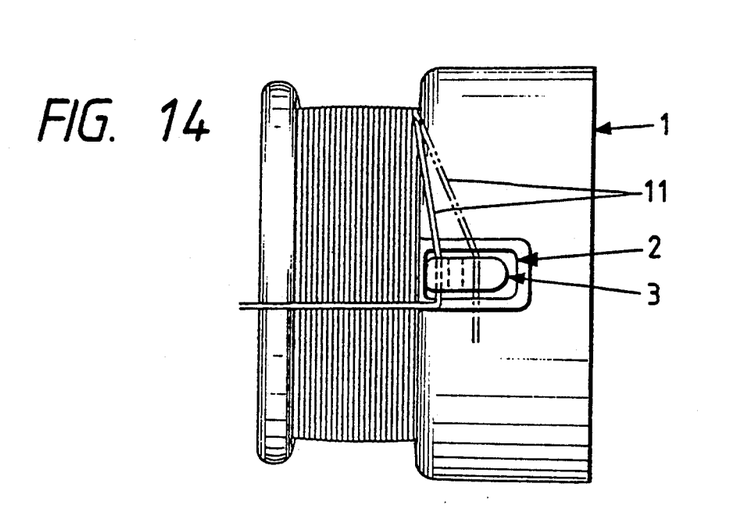
FIG. 14 is a plan view showing a fishing line wound on the spool.

FIGS. 12 to 14 show an eighth embodiment of a fishing line retaining device adapted to a spinning reel for fishing. FIG. 12 is a longitudinally sectional view of a main part of a spool; FIG. 13 is an enlarged, longitudinally sectional view of a main part of a fishing line retaining device; and FIG. 14 is a plan view of a spool on which the fishing line is wound.

In this embodiment, in comparison with the first embodiment, respective axial front sides of an outer member 3 and an inner member 2 protrude forward enough to form fishing line holding faces 3f and 2c directed to the direction of supplying the fishing line.

With this construction, like the first embodiment, even when the fishing line 11 is retained and held between an retaining face 2b of the inner member 2 and an retaining face 3d of the outer member 3 as shown by two-dot chain lines in FIG. 14, the fishing line 11 is prevented from being damaged and cut off even when it is rubbed.

Further, in the case where the fishing line 11 is sandwiched between the fishing line holding faces 3f and 2c during fishing for biting of fish, as shown by a solid line in FIG. 14, even when the fishing line 11 is wound on a spool 1 rather too much, the outer periphery of the wound fishing line 11 is fixed and held by the fishing line 11 sandwiched by the fishing line holding faces 3f and 2c. Therefore, the looseness of the fishing line can be prevented. Particularly, the wound fishing line 11 is prevented from being loosened due to water flow. When the fishing line 11 is pulled by the pulling force of the caught fish, the fishing line 11 can be supplied from the fishing line holding faces 3f and 2c owing to its tension. Since the fishing line 11 is not cut off, the fishing line can be safely used in fishing for biting of fish.

Figure 15:
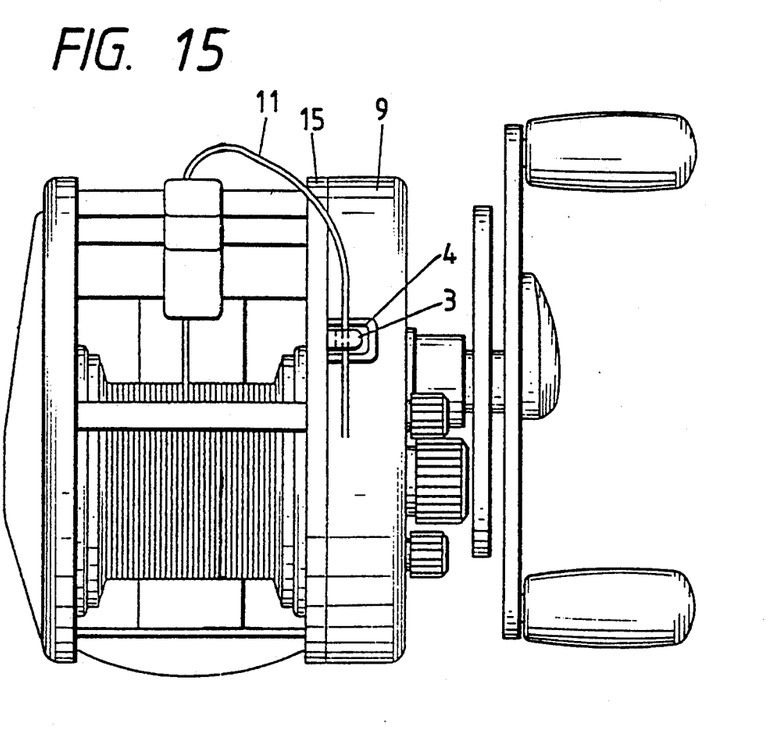
FIG. 15 is a plan view of a double-bearing type reel showing a ninth embodiment of a fishing line retaining device for the double-bearing type reel for fishing.
Figure 16:
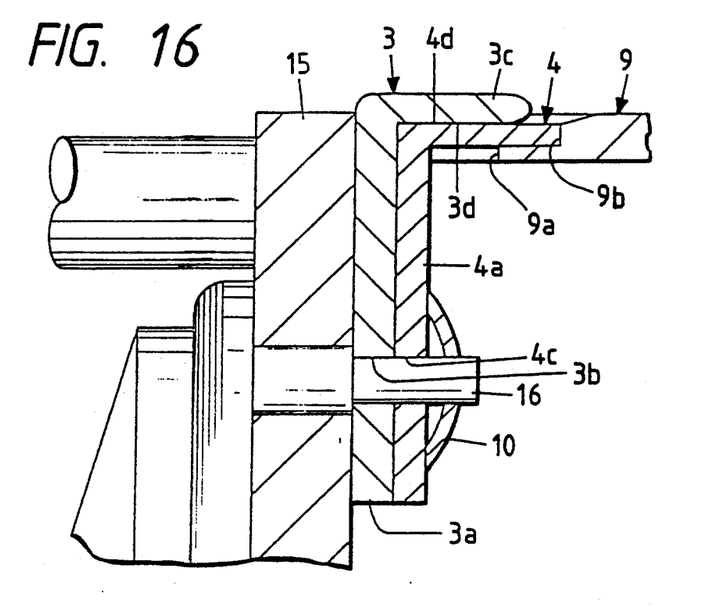
FIG. 16 is an enlarged, longitudinally sectional view of a main part of the above described fishing line retaining device.

FIGS. 15 and 16 show a ninth embodiment of a fishing line retaining device adapted to a double-bearing type reel for fishing. FIG. 15 is a plan view of a double-bearing type reel and FIG. 16 is an enlarged, longitudinally sectional view of a main part of a fishing line retaining device.

In this embodiment, the fishing line retaining device of the third embodiment shown in FIG. 7 is incorporated in a double-bearing type reel. A pin 16 is fixed to a side frame 15 of the main body of the reel. The pin 16 is fitted into a through hole 3b of a leg part 3a of a fishline retaining outer member 3 and a through hole 4c of a leg part 4a of a fishline retaining inner member 4. A spring washer 10 is fitted onto the pin 16 so that the outer and inner members 3 and 4 are prevented from falling off from the pin 16.

A square hole 9a and a recessed part 9b are formed on a reel side plate 9 attached to the side frame 15. The inner member 4 is fitted into and secured to the square hole 9a and the recessed part 9b.

On an upper face of an upper side of the inner member 4 is formed an retaining face 4d.

On a lower face of an retaining part 3c of the outer member 3 is formed an retaining face 3d.

As mentioned above, according to the present invention, since the retaining face of the inner member and the retaining face of the outer member are substantially planar and simple in configuration, the removal of burrs can be easily performed. Since, the burrs are not formed, the fishing line has no flaws and is not cut even when it is rubbed. Accordingly, there is provided a fishing line retaining device for a fishing reel with an excellent effect in practice in that the removal of burrs can be easily performed at low cost.

Further, since the fishline can be held only by the fishline retaining inner and outer member, it is possible to omit the burr removing processing for the hole portion of the reel main body and/or the spool which portion is complicated in configuration, to thereby reduce the manufacturing cost of the fishing reel.

As described above, although the pin is fitted into the through holes of the leg part of the outer member and of the leg part of the inner member so that the outer and inner members are prevented from falling off therefrom by means of the spring washer, it will be readily appreciated that a machine screw may be used for preventing the removal of the outer and inner members.

In the above description, although the reel for fishing is employed for the spinning reel for fishing and the double-bearing type reel for fishing, it may be applied to another type of reel for fishing.

The present invention is not confined to the embodiments described above, but may be embodied or practiced in other various ways without departing the spirits or essential of the invention.

What is claimed is:

1. A fishing line retaining device adapted to retain in place a fishing line wound on a spool, said retaining device comprising:
   an aperture in said spool;
   an inner retaining member fitted in said aperture, said inner retaining member including a first retaining face surrounding a hole therethrough, said hole being relatively smaller than said aperture; and
   an outer retaining member fitted through said hole, said outer retaining member including a second retaining face confronting said first retaining face, wherein said fishing line is adapted to be retained between said first and second retaining faces.

2. The fishing line retaining device according to claim 1, wherein at least one of said outer and inner retaining members is made of flexible material.

3. The fishing line retaining device according to claim 1, further comprising:
   spring means for biasing said outer retaining member so that said second retaining face is brought into contact with said first retaining face.

4. The fishing line retaining device according to claim 1, further comprising:
   means for connecting said outer and inner retaining members together so that said outer and inner retaining members are removably mounted onto said spool as a unit.

5. The fishing line retaining device according to claim 1, wherein said outer and inner retaining members are formed with third and fourth retaining faces, respectively, and said third and fourth retaining faces are adapted to retain and clamp said fishing line therebetween.

6. The fishing line retaining device according to claim 1, wherein said outer and inner retaining members are mounted on said spool and extend through said aperture formed in said spool.

7. The fishing line retaining device according to claim 6, wherein each of said outer and inner retaining members has a leg portion which is inserted through said aperture into the inside of said spool so as to be secured to said spool.

8. The fishing line retaining device according to claim 1, wherein said outer retaining member further comprises a L-shaped leaf spring fixing said outer retaining member to said spool.

* * * * *